(12) United States Patent
Schneider et al.

(10) Patent No.: US 11,294,139 B2
(45) Date of Patent: Apr. 5, 2022

(54) OPTOELECTRONIC SENSOR AND METHOD OF FOCUS ADJUSTMENT

(71) Applicant: SICK AG, Waldkirch (DE)

(72) Inventors: Florian Schneider, Waldkirch (DE); Tobias Pontiggia, Waldkirch (DE); Thomas Pfrengle, Waldkirch (DE)

(73) Assignee: SICK AG, Waldkirch (DE)

( * ) Notice: Subject to any disclaimer, the term of this patent is extended or adjusted under 35 U.S.C. 154(b) by 412 days.

(21) Appl. No.: 16/271,247

(22) Filed: Feb. 8, 2019

(65) Prior Publication Data

US 2019/0250364 A1    Aug. 15, 2019

(30) Foreign Application Priority Data

Feb. 9, 2018   (EP) .................................... 18155926

(51) Int. Cl.
*G02B 7/02*   (2021.01)
*G02B 7/08*   (2021.01)
*G02B 7/09*   (2021.01)
*G06K 7/14*   (2006.01)
*H04N 5/225*  (2006.01)

(52) U.S. Cl.
CPC ............... *G02B 7/026* (2013.01); *G02B 7/08* (2013.01); *G02B 7/09* (2013.01); *G06K 7/1413* (2013.01); *H04N 5/2254* (2013.01)

(58) Field of Classification Search
CPC ... G02B 7/08; G02B 7/09; G02B 7/04; G02B 13/001; G02B 7/026; G02B 13/005; G02B 27/646; G02B 7/003; G02B 7/023; G02B 7/102; G02B 7/282; G02B 7/021; G03B 3/10; G03B 2205/0069; G03B 5/00; G03B 13/36; G03B 17/12; G03B 2205/0007; G03B 2217/005; G03B 2205/0023; G03B 5/06; G03B 15/006
See application file for complete search history.

(56) References Cited

U.S. PATENT DOCUMENTS

| 4,184,927 A * | 1/1980 | Takahashi ............... C25D 11/04 204/204 |
| 5,257,279 A | 10/1993 | Dugan et al. |
| 2006/0242660 A1 | 10/2006 | Kimura et al. |
| 2009/0208197 A1 | 8/2009 | Nomura et al. |

(Continued)

FOREIGN PATENT DOCUMENTS

| DE | 102016112123 A1 | 1/2018 |
| EP | 0757270 B1 | 12/2003 |

(Continued)

OTHER PUBLICATIONS

Search Report dated Jul. 27, 2018 issued in corresponding European Application No. 18155926.1.

*Primary Examiner* — Brandi N Thomas
(74) *Attorney, Agent, or Firm* — Nath, Goldberg & Meyer; Jerald L. Meyer

(57) ABSTRACT

An optoelectronic sensor is provided comprising an optics with focus adjustment, wherein the sensor has a movable carrier element having the optics and a fixed position holding element, and wherein the position of the movable carrier element is variable with respect to the holding element for an adjustment of a focal position. In this respect, at least one rolled leaf spring is arranged between the carrier element and the holding element.

16 Claims, 4 Drawing Sheets

(56) References Cited

U.S. PATENT DOCUMENTS

| | | | |
|---|---|---|---|
| 2010/0067130 A1 | 3/2010 | Kim et al. | |
| 2014/0211203 A1* | 7/2014 | Kuo | G03B 17/565 |
| | | | 356/124 |
| 2016/0178923 A1* | 6/2016 | Hayashi | G02B 27/646 |
| | | | 359/557 |

FOREIGN PATENT DOCUMENTS

| | | |
|---|---|---|
| EP | 1895343 A1 | 3/2008 |
| EP | 2498113 B1 | 3/2013 |
| JP | 61-151848 A | 7/1986 |

\* cited by examiner

OPTOELECTRONIC SENSOR AND METHOD OF FOCUS ADJUSTMENT

FIELD

The invention relates to an optoelectronic sensor comprising an optics with focus adjustment, wherein the sensor has a movable carrier element having the optics and a fixed position holding element, and wherein the position of the movable carrier element is variable with respect to the holding element for an adjustment of a focal position. The invention further relates to a method for the focus adjustment of an optics of an optoelectronic sensor, wherein a movable carrier element having the optics varies its position with respect to a fixed position holding element for a setting of a focal position.

BACKGROUND

The focusing of an optics is a task that is required for a very large group of optoelectronic sensors. This relates both to the transmission side when a light beam is to be transmitted or when a light pattern is to be projected and to the reception side for the detection of light beams or even images. A barcode scanner having a focused reading beam is used in this description as an example for a focusing at the transmission side and a camera for a focused recording of images is used as an example for a focusing at the reception side without thus excluding other optoelectronic sensors having a focus adjustment. As the example of a 3D camera with a projected illumination pattern shows, there is also a need for a focusing both on the transmission side and on the reception side.

Cameras are used inter alia in industrial applications in a variety of ways to automatically detect object properties, for example for an inspection or a measurement of objects. In this respect, images of the object are recorded and are evaluated in accordance with the object by image processing methods. A further use of cameras is the reading of codes. Objects with the codes located thereon are recorded with the aid of an image sensor and the code regions are identified in the images and then decoded. Camera-based code readers also cope without problem with different code types than one-dimensional barcodes which also have a two-dimensional structure like a matrix code and provide more information. The automatic detection of the text of printed addresses (optical character recognition, OCR) or of handwriting is also a reading of codes in principle. Despite this greater variety with camera-based readers, the specialized barcode scanners, that are as a rule less expensive with the same reading power, are still widely used. Typical areas of use of code readers are supermarket cash registers, automatic parcel identification, sorting of mail shipments, baggage handling at airports, and other logistic applications.

A frequent detection situation is the installation of a code reader or of a camera for inspection work or measurement work above a conveyor belt. The camera records images during the relative movement of the object stream on the conveyor belt and stores the detected information or instigates further processing steps in dependence on the object properties acquired. Such processing steps can comprise the further processing adapted to the specific object at a machine which acts on the conveyed objects or a change to the object stream in which specific objects are expelled from the object stream within the framework of a quality control or the object stream is sorted into a plurality of partial object streams. The objects are identified by a code reader with reference to the applied codes for a correct sorting or similar processing steps.

The focus position must be set to be able to work with different working distances and in particular to be able to read codes at different distances. There are different technologies for this. Typically, the position of the object is changed, that is the distance between the object and the image sensor, to achieve a refocusing. This is frequently done automatically with the aid of a stepper motor or of a moving coil.

EP 2 498 113 A1 proposes a focus adjustment for a camera-based code reader with the aid of a motor-powered cam plate and a parallel guide of the objective in a spring support that has a plurality of flat leaf springs. The parallel guide is, however, complex and also requires a lot of construction space.

DE 10 2016 112 123 A1 discloses a barcode scanner having a transmission optics on a pivot arm that is pivoted for a focusing of the reading beam with a moving coil actuator. This also takes up quite a lot of construction space. In addition, an offset is produced between the transmission optics and the light transmitter due to the circular movement of the pivot arm.

EP 757 270 B1 deals with an autofocus apparatus in which a lens carrier having lenses is elastically axially moved in a mechanical guide from two leaf spring diaphragms that are arranged in parallel with one another and perpendicular to the optical axis of the lenses. The guidance properties and force distribution properties of this arrangement are, however, not comparable with a parallel guide as in EP 2 498 113 A1.

An autofocusing lens holder is likewise held between two leaf springs that have a central aperture for the lens holder movable along the optical axis in US 2016/0178923 A1. However, the focus adjustment as a complex structure that is large in size overall.

SUMMARY

It is therefore the object of the invention to provide an improved focus adjustment. This object is satisfied by an optoelectronic sensor and by a method for focus adjustment in accordance with the respective independent claim. The sensor comprises an optics and a focus adjustment therefor. The optics is located on a movable carrier element for this purpose. The position of the movable carrier element is varied with respect to a fixed-position holding element for a setting of a focal position.

The invention starts from the basic idea of an improved suspension of the carrier element that is based on a rolled leaf spring. This rolled leaf spring is arranged between the carrier element and the holding element.

The invention has the advantage that a compact mechanical suspension having large, scalable adjustment travels is achieved. A high long-term stability results due to the use of metal components and deformations of the leaf spring in the elastic range.

The carrier element is preferably supported linearly movably along the optical axis of the optics by means of the rolled leaf spring. A light transmitter or light receiver is preferably located in the extension of the optical axis. The linear movement then changes the distance of the light transmitter or light receiver from the optics and thus the focal position.

The rolled leaf spring preferably forms a ring. The leaf spring is rolled together and closed at its ends for this purpose. A certain overhang is conceivable as long as the required elastic properties are not thereby impaired. The term ring is initially meant topologically. The shape of the ring is rather similar to a ellipse than to a circle, with the sides of the ellipse being deformed in dependence on the contour present there. For in the contact region to the carrier element and to the holding element, the rolled leaf spring follows the contour predefined there, and indeed over a certain peripheral region that provides sufficient stability.

The carrier element is preferably movable in a direction in the plane of the ring. The movement during a focus adjustment therefore does not take place transversely or even perpendicular to the ring. The mutual alignment of the carrier element and of the leaf spring can also be expressed such that a diameter of the ring is aligned in parallel with the optical axis, and indeed preferably the longest diameter corresponding to the rough elliptical shape explained in the previous paragraph.

The rolled leaf spring is preferably fixed to the carrier element and to the holding element. It is thus prevented that the rolled spring leaf slips relative to the carrier element or to the holding element on an adjustment of a focal position. Exactly one respective fixing point is preferably provided. This is sufficient for a fixing on the one hand and enables a movement over large adjustment paths and without unnecessary resistance on the other hand.

The flat outer side of the rolled leaf spring is preferably pressed toward the holding element and the carrier element. The contact between the rolled leaf spring and the holding element and carrier element is therefore areal and not, for instance, only over an edge of the leaf spring. This provides a reliable guidance and adjustment that is then also maintained.

The rolled leaf spring is preferably clamped between the holding element and the carrier element. The rolled leaf spring is thus so-to-say framed from both sides and is at least a little compressed. The corresponding outer surfaces of the leaf spring contact the holding element and the carrier element. The carrier element and the holding element elastically deform the rolled leaf spring interposed between them.

The carrier element and the holding element each have a surface, said surfaces being in parallel with one another. In this connection, however, the term parallel is to be given a broad interpretation. On the one hand, a certain angle is allowed and even desired in some embodiments. In addition, the surfaces themselves are not necessarily planar, which then likewise requires a modified understanding of a parallel alignment. The surfaces at least do not abut one another and are located at oppositely disposed outer sides of the rolled leaf spring.

The rolled leaf spring preferably rolls on or off the surfaces during a movement of the movable carrier element. A section of the flat outer side of the leaf spring of substantially the same length remains in contact with the framing surfaces of the carrier element and of the holding element in the rolling movement during an adjustment movement of the optics on the movable carrier element. In this respect, the rolled leaf spring rotates in the course of the rolling movement and the section in contact is slightly different at every point in time in accordance with the rolling movement.

The surface preferably has a contour to exert a preload on the rolled leaf spring. The holding element and/or the carrier element is/are therefore not planar and in parallel with one another. The contour that can also only be a slanted planar surface provides an adjustment of the spring preload per the design of the geometry. The rolled leaf spring overcomes some sections of the surfaces more easily than others, which has to do, for example, with the local spacing between the surfaces that span the rolled leaf spring. Consequently, the force that is required for a respective adjustment is dependent on the intermediate positions and end positions to be adopted in a linear or non-linear manner effectively predefined as the preload by the design.

The contour preferably has latch positions. They are special shapes of the surfaces that set a preload against an adjustment from the focus position corresponding to a latch position in both directions. The carrier element and thus the optics therefore remains in a latch position without a force effect. An actuator first has to acct on the carrier element again if a focus adjustment from the previously set latch position is desired.

The sensor preferably has at least two holding elements and at least two rolled leaf springs, with the holding elements being arranged at at least two sides of the movable carrier element with a respective rolled leaf spring therebetween. The carrier element is preferably located centrally between the leaf springs. The guidance of the movable carrier element is improved by a plurality of holding elements and leaf springs. One holding element having a plurality of surfaces that effectively act as individual holding elements can also be used instead of a plurality of holding elements.

The carrier element preferably has an annular outer surface and the holding element has an annular inner surface, with the carrier element being concentrically arranged in the holding element and carrying out a rotational movement by a rolling off of the rolled leaf spring therebetween. The suspension concept in accordance with the invention is not restricted to only linear movements. A rotational movement is also conceivable in the described manner. In this respect, at least two rolled leaf springs are preferably used, for example three rolled leaf springs, to achieve a uniform, reliably guided movement with nevertheless as few components as possible.

The sensor preferably comprises a light transmitter, with the optics being configured as a transmission optics associated with the light transmitter and/or comprises a light receiver, with the optics being configured as a reception optics associated with the light receiver. The light transmitter or the light receiver is preferably arranged on the optical axis of the optics so that a movement of the carrier element changes the distance therebetween and thus the focal position. It is also conceivable that the focal position of the sensor is adjustable both at the transmission side and at the reception side. In a coaxial arrangement of the light transmitter and the light receiver, the optics then serves as a common transmission and reception optics. In a biaxial arrangement, it is both conceivable that the light transmitter and the light receiver each have their own focus adjustments having movable carrier elements, fixed position holding elements, and rolled leaf springs therebetween and that the transmission optics and the reception optics are located together on the same movable carrier element and a focus adjustment is only possible together.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
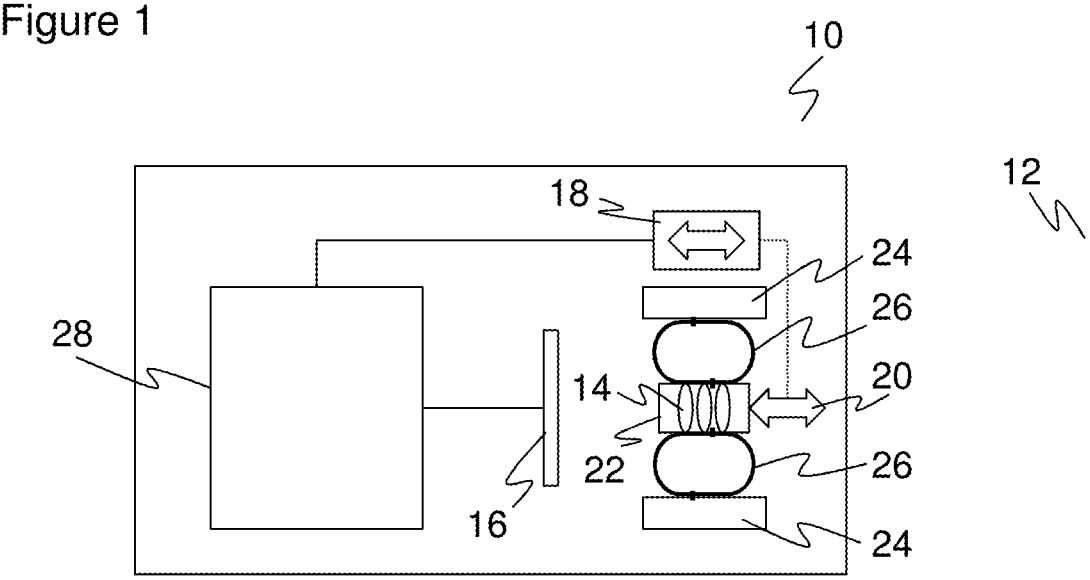
FIG. 1 a block diagram of a camera having a reception optics with focus adjustment.

FIG. 1 shows a block diagram of a camera as an example of an optoelectronic sensor 10 having a focus adjustment at the reception side. Received light from a detection zone 12 is incident on a reception optics 14 that conducts the received light to a light receiver 16. In the case of a camera, the light receiver 16 is an image sensor having a plurality of light reception elements in a linear arrangement or a matrix arrangement. Other sensors 10 use a photodiode, an APD (avalanche photodiode), or also a SPAD (single photon avalanche diode) receiver.

The reception optics 14 is shown here purely by way of example with three lenses. It is generally any desired objective composed of lenses and other optical elements such as diaphragms, prisms and the like and in the simplest case is a single lens.

The reception optics 14 is movably suspended to adjust the focal position of the sensor 10. The reception optics 14 is displaced with the aid of an actuator 18, for examples a stepper motor or a moving coil actuator, along its optical axis on which the light receiver 16 is also arranged, as shown by an arrow 20. These distance changes between the reception optics 14 and the light receiver 16 effect a refocus.

The suspension in the example shown comprises a movable carrier element 22 having the reception optics 14, a two-part fixed position holding element 24, and two rolled leaf springs 26 therebetween. The suspension and the focus adjustment as well as variations thereof will be explained more exactly below with reference to FIGS. 3 to 7. It must still be noted that the shown position of the actuator 18 and the engagement point of the arrow 20 is only to be understood functionally and not geometrically. The actuator 18 preferably only engages at the periphery of the carrier element 22 so as not to interfere with the light paths. The rolled leaf springs 26 in particular leave the region of the carrier element 22 above and below the plane of the paper freely accessible.

A control and evaluation unit 28 is connected to the light receiver 16 and to the actuator 18. A received signal of the light receiver 16 is read by the control and evaluation unit 28 and is stored as an image for example, is prepared, or is examined for code regions in a camera-based code reader, with said code regions then being decoded. A respectively required focal position is set via the actuator 18, which can also be implemented with the aid of an additional distance sensor, not shown, as an autofocus.

Figure 2:
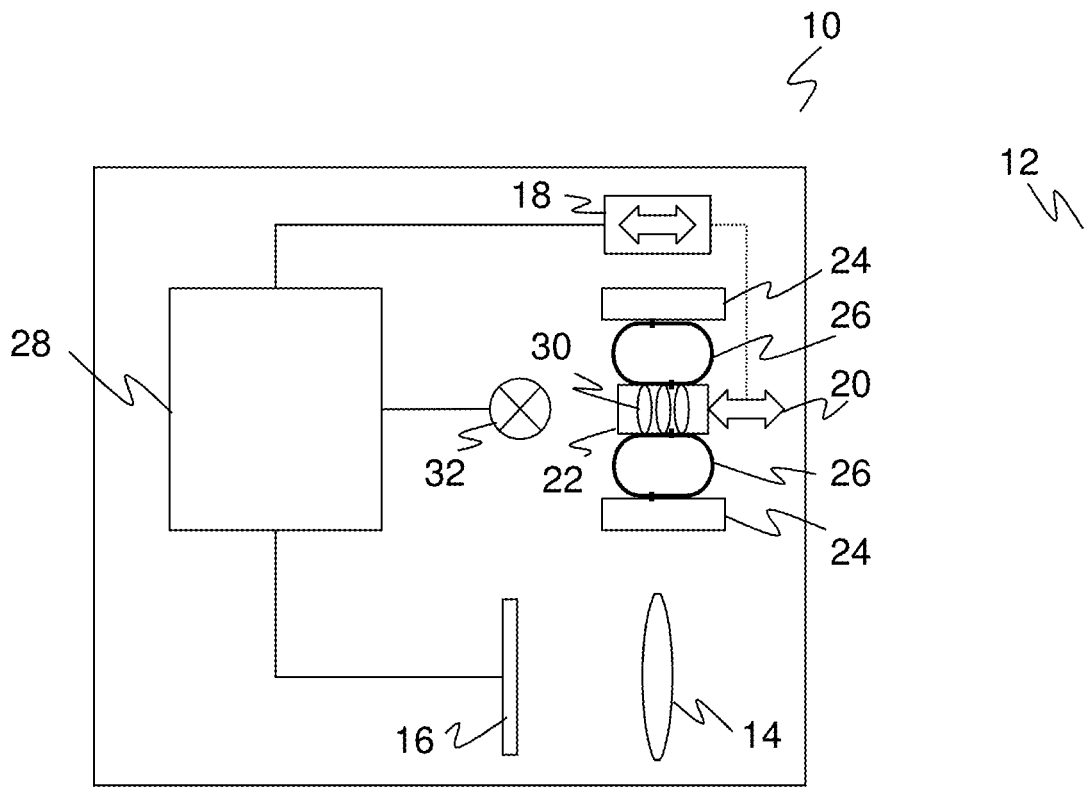
FIG. 2 a block diagram of an optoelectronic sensor having a light transmitter and having a transmission optics with focus adjustment.

FIG. 2 shows a block diagram of a further embodiment of an optoelectronic sensor 10. The same reference numerals here refer to the same features or to features corresponding to one another that will not be described again. Unlike FIG. 1, a focus adjustment of a transmission optics 30 of a light transmitter 32 at the transmission side is provided here, for example having an LED or a laser as the light source. The reception optics 14 is rigid in contrast. In further embodiments, the position of the reception optics 14 having the focus adjustment can also be changed, the reception optics 14 can have a further focus adjustment, or the reception optics 14 can be configured in a coaxial design as a common optics that simultaneously acts as a transmission optics 30.

The suspension and the change of the focal position by a movement of the transmission optics 30 on the carrier element 22 takes place in the same manner as in FIG. 1 to be explained in more detail with reference to FIGS. 3 to 7.

An example of an optoelectronic sensor 10 having the basic design in accordance with FIG. 2 is a barcode scanner. The light transmitter 32 generates a reading beam by means of the transmission optics 30 and said reading beam returns after reflection at an object, in particular a code region, in the detection zone 12 and is conducted via the reception optics 14 to the light receiver 16. So as not only to detect a point, but rather the whole barcode, a scan takes place by means of a scanning mechanism, not show; for example using a pivoting or rotating mirror that moves the reading beam over the code region.

It is the object of the focus adjustment to focus the reading beam sufficiently so that the code elements are resolved. The focusing on a fixed or parameterized distance can be sufficient for this purpose. The current distance is, however, preferably measured. As an advantageous alternative to an additional distance sensor, its reading beam can itself be used for a distance measurement in that a frequency is imparted to the reading beam, by amplitude modulation, for example, and the distance is determined from the phase offset between the time of transmission and the time of reception in a phase process.

When scanning a barcode, the amplitude of the received signal conducted to the control and evaluation unit 28 by the light receiver 16 is modulated in a corresponding manner in the code bars. The evaluation unit 26 is therefore able to read the code information. It also recognizes when the received signal does not correspond to any code. The localization of code regions and the reading of the code information is known per se and will therefore not be explained in more detail.

Figure 3A:
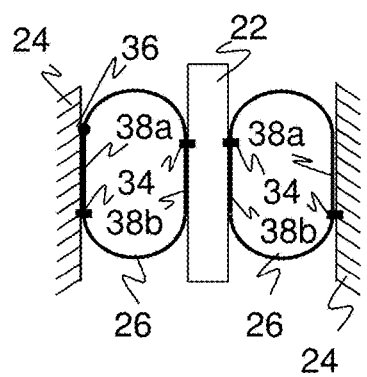
FIGS. 3a-c schematic sectional representations of a suspension for an optics on a movable carrier between rolled leaf springs in different positions.
Figure 3B:
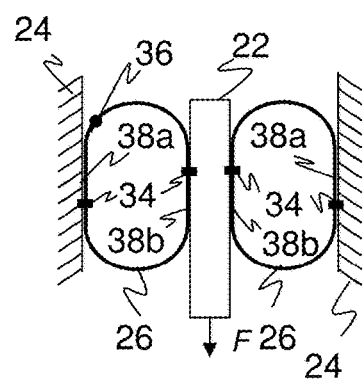
Figure 3C:
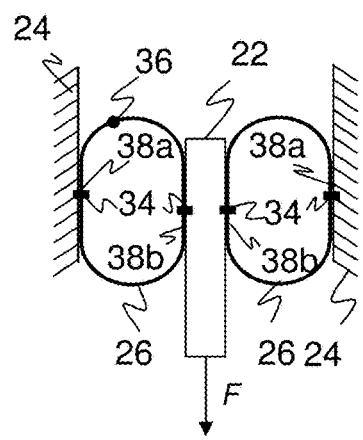

FIGS. 3a-c show schematic sectional representations of the suspension for the focus adjustment in different deflection states by different forces of the actuator 18, as shown by arrows marked by "F". The optics 14, 30 on the movable carrier element 22 has been omitted here for a clearer explanation of the mechanical principle.

The movable carrier element 22 is clamped between the fixed position holding element 24 at both sides by means of the two rolled leaf springs 26. The movable carrier element 22 acts as an oscillator, the fixed position holding element 24 as a stator. The rolled leaf springs 26 are fasted to the movable carrier element 22 and to the holding element 24 with a respective fixing point 34. The fixing is also conceivable at additional points, but this shortens the possible adjustment path; or it can conversely also be omitted since the rolled leaf springs 26 are clamped by their spring force and the roll friction is smaller than the static friction.

A force effect on the movable carrier element 22 in the direction of the longitudinal axis, that preferably corresponds to the optical axis of the optics 14, 30, effects a rolling on or off of the rolled leaf springs 26. To understand the different positions of this rolling movement in FIGS. 3*a-c*, a fixed location on the rolled leaf springs 26 is marked by a black dot 36.

The rolled leaf springs 26 form a ring that can be seen in cross-section. The ring is elongated by the clamping between the carrier element 22 and the holding element 24, but still deviates from an ellipse since the lateral regions of the rolled leaf springs 26 approximate to the respective contour of the contact surfaces 38*a-b* with the carrier element 22 and the holding element 24. The rolled leaf springs 26 can only be seen as a line due to the cross-sectional representation. In fact, the ring has an areal extent in the direction perpendicular to the plane of the paper, corresponding to the nature of a leaf spring. The corresponding lateral outer surfaces are pressed by the spring force toward the contact surfaces 38*a-b* of the carrier element 22 and the holding element 24. Due to the rolling movement, the same length of the rolled leaf springs 26 laterally contact the carrier element 22 and the holding element 24 in all adjustment positions. The large contact surface 38*a-b* effects a stabilization of the adjustment movements and of the set focus positions. The displacement can be influenced via the length of the contacting portion of the rolled leaf springs 26.

The movement of the carrier element 22 takes place linearly, from top to bottom in the plane of the drawing, in accordance with the optical taxis of the optics 14, 30, not shown. The plane of the drawing is simultaneously the plane of the ring of the rolled leaf springs 26 in which the movement consequently remains. In other words, the direction of movement is in parallel with a diameter of the ring, in particular of the longest diameter, that arises due to the clamping. The lateral guidance is ensured by the leaf springs 26 that roll off and by their spring force. With unequal rolled leaf springs 26 having different spring forces, a certain rotation is superposed on the linear movement; the movement is then no longer strictly in parallel with the longest diameter, but only tangential to both rolled leaf springs 26, which can, however, still be understood as parallel within the framework of the required displacements.

Figure 4A:
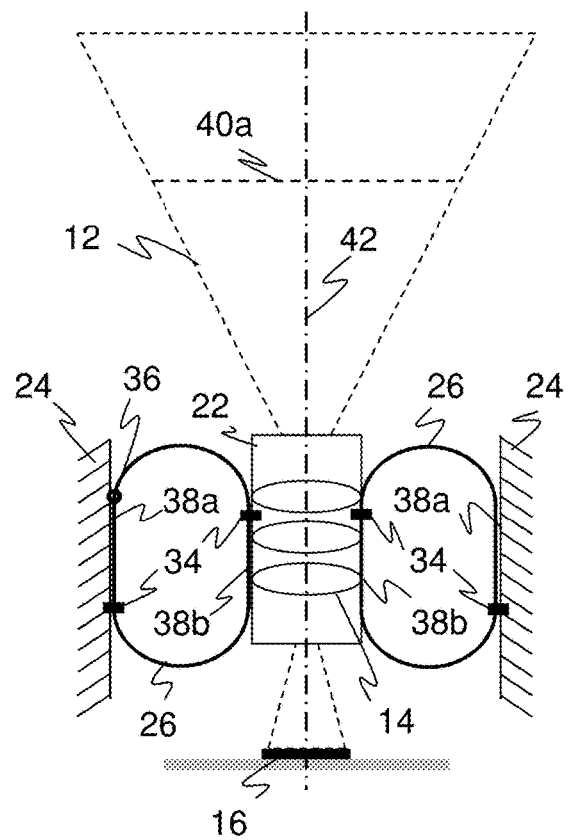
FIGS. 4a-b schematic sectional representations of a reception optics with focus adjustment on the basis of the suspension in accordance with FIGS. 3a-c in different focal positions.
Figure 4B:
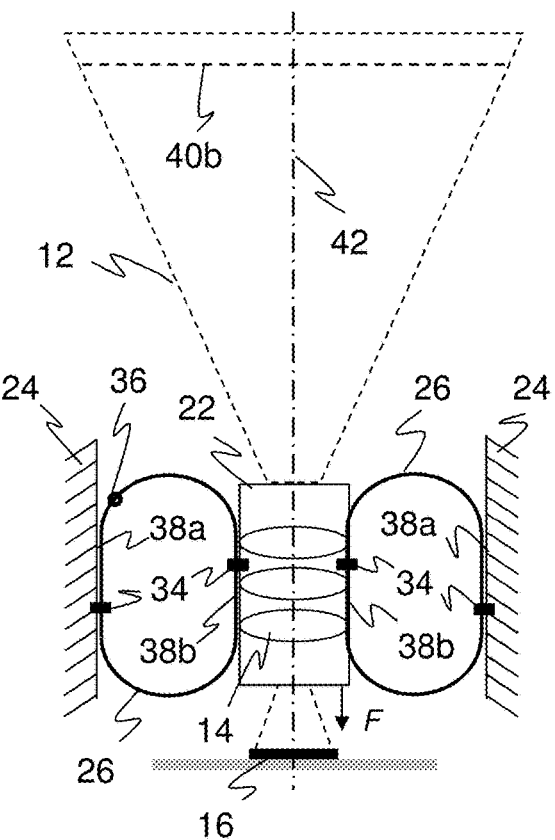

FIGS. 4*a-b* show a schematic sectional representation of the focus-adjustable reception optics 14 on the basis of the mechanical suspension just explained for two different focal positions 40-*b*. In FIG. 4*a*, the movable carrier element 22 is located without a force effect of the actuator 18 in a starting position with a first focal position 40*a*. In FIG. 4*b*, the actuator 18 effects a downward force "F". While the rolled leaf springs 26 roll off, the carrier element 22 together with the reception optics 14 accordingly moves downward along the optical axis 42. The shortened distance between the reception optics 14 and the light receiver 16 effects a displacement to the new focal position 40*b*.

A refocus in the transmission path works analogously; the light receiver 16 would only have to be replaced with the light transmitter 32 here. The geometries, masses, and further optical and other parameters naturally also have to be set to the different task. It is in principle conceivable in a reverse arrangement to accommodate the light receiver 16 or the light transmitter 32 on the movable carrier element 22 and thus to vary their position with respect to a fixed position optics 14, 30. This likewise effects a focus adjustment, but the embodiment shown is more advantageous since no electrical connections to a moving part are required.

Figure 5A:
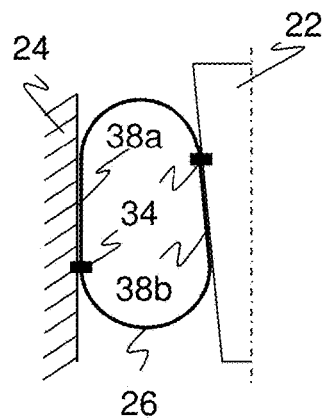
FIGS. 5a-b schematic sectional representations of a suspension with a linearly varying preload.
Figure 5B:
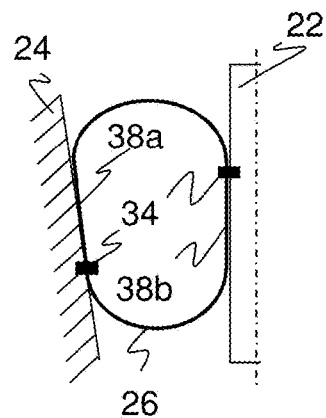
Figure 5C:
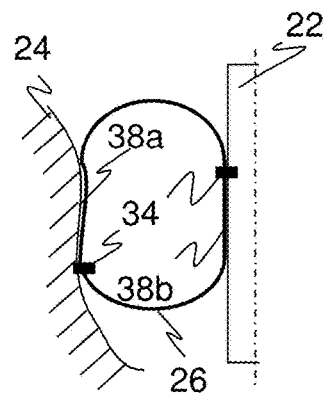
FIG. 5c a schematic sectional representation of a suspension with a selectively varying preload by a free-form design of the surface of the holder.

In the previous embodiments, the contact surfaces 38*a-b* with the rolled leaf springs 26 of the carrier element 22 and the holding element 24 are planar and in parallel with one another. FIGS. 5*a-c* show some examples how the preload or stiffness of the suspension can be varied for the focus adjustment by the design, that is by an alternative special shape of the contact surfaces 38*a-b*. The stiffness generally depends on the material properties of the rolled leaf springs 26 and on their geometries, that is on the bend radii. The design variants explained with reference to FIGS. 5*a-c* are not, however, only directed to these global parameters, but to locally different preloads per focus position.

The basic idea here is to vary the distance between the carrier element 22 and the holding element 24. The rolled leaf spring 26 is thereby clamped more or less, different bend radii are produced, and the rolled leaf spring 26 accordingly counteracts a rolling into the respective position more or less strongly.

FIGS. 5*a-b* show an example with a linear variation of the preload. By slanting at least one of the contact surfaces 38*a-b*, the distance between the carrier element 22 and the holding element 24 increases or decreases linearly from top to bottom along the optical axis. In FIG. 5*a*, the contact surface 38*b* of the carrier element 22 is slanted so that downward movements have to overcome increasingly less preload. In FIG. 5*b*, as an alternative, the contact surface 38*a* of the holding element 24 is slanted so that now conversely the downward spacing becomes shorter so that the preload increases on downward movements of the carrier element 22. As a further alternative, both the carrier element 22 and the holding element 24 could have slanted contact surfaces 38*a-b*.

FIG. 5*c* shows an example in which a freeform surface is designed instead of a linear variation by the slanted, but still planar contact surfaces 38*a-b* in accordance with FIG. 5*a-b*. Different preloads or spring constants that are largely freely selectable in a large variation range due to the shape of the freeform surface are thereby produced in different positions of the carrier element 22. A freeform surface can here start from a slanted surface as in FIGS. 5*a-b*.

A freeform surface provides the advantageous possibility of directly introducing specific latch positions. They are focal positions in which the carrier element 22 also remains in position without an effect of force of the actuator 18 so that the actuator 18 only has to be respectively temporarily active to change into a latch position. A latch position can therefore be held without external force. This is already provided to a certain extent by the static friction of the rolled leaf springs 26. A latch position is characterized in that a preload has to be overcome in both adjustment directions to leave the latch position.

Alternatively to a shape of the contact surfaces 38*a-b*, it is also conceivable to directly provide the rolled leaf springs 26 themselves with different properties depending on the roll position. This could be implemented by variations of material and thickness; however, they require a rather complex manufacturing process. It is simpler to directly plastically deform the rolled leaf springs 26 before their installation. This then produces different lateral force effects on the carrier element 22 depending on its position.

In the previously presented embodiments, the suspension respectively comprises two rolled leaf springs 26. This constellation is shown again in a simplified plan view in FIG. 6a that only shows the movable carrier element 22, the fixed position holding element 24, and the two rolled leaf springs 26 therebetween. The arrangement diametrically opposite, rather than the alignment of the two leaf springs 26 with respect to one another at an angle of 180°, is particularly advantageous since there is then no resulting spring force what acts laterally on the carrier element 22. Due to their widths, the rolled leaf springs 26 could, however, also compensate a certain deviation, particularly if two rolled leaf springs 26 having different properties are used. It is additionally conceivable to set an additional counterpoint against the resulting force by a further holding element. It is also possible in accordance with this principle to implement the suspension with only one rolled leaf spring 26, where the further holding element is then on the opposite side. On the rolling on and off of the then only rolled leaf spring 26, in this case only a friction between the counterside of the carrier element 22 and the further holding element has to be overcome that can also be reduced by auxiliary elements or the carrier element 22 is fixed there by the friction or direct means and rotates about the further holding element.

Figure 6A:
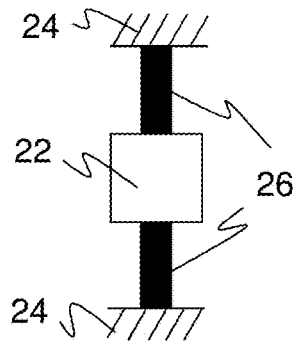
FIGS. 6a-c schematic plan views of a suspension having two, three, and four rolled leaf springs.
Figure 6B:
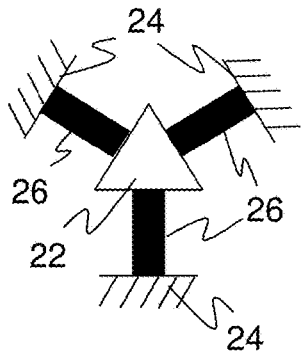
Figure 6C:
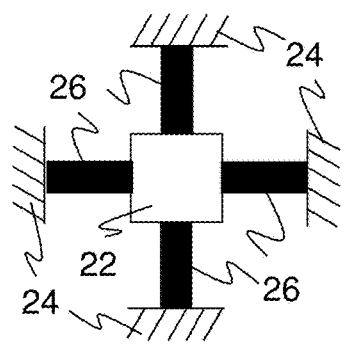

FIGS. 6b and 6c show embodiments for a suspension with three rolled leaf springs 26 or four rolled leaf springs 26. The suspension is respectively symmetrical with a centrally supported carrier element 22, which is advantageous, but not necessarily the case. The use of more than two rolled leaf springs 26 can improve the guidance properties and can inter alia improve the mechanical stability with respect to external influences. Even more rolled leaf springs 26 are also possible.

On the use of rolled leaf springs 26 that are the same as each other, there is a linear movement of the oscillator out of the plane of the paper. If different rolled leaf springs 26 are used that differ in parameters such as geometry, preload, material, or material thickness, a rotation is superposed on the linear movement.

The previous suspensions provide an at least substantially linear movement of the carrier element 22. As already stated, a rotary component can be achieved by different rolled leaf springs 26. Another possibility that has likewise already been addressed comprises arranging or even fixing the carrier element 22 at least one side to a further holding element without a rolled leaf spring 26 therebetween.

Figure 7:
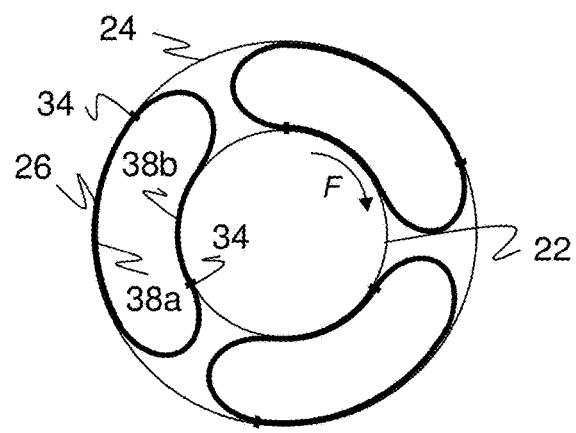
FIG. 7 a schematic sectional view of a suspension for a rotational movement instead of a linear movement.

FIG. 7 shows how a movement that is purely rotational can also be very directly implemented as required with the concept of a movable carrier element 22 supported in rolled leaf springs 26. The carrier element 22 for this purpose has an annular outer surface as a contact surface 38b; the holding element 24 has a corresponding annular inner surface as a contact surface 38a. A plurality of rolled leaf springs 26 are distributed over the periphery of the intermediate space. A preferred arrangement provides a uniform distribution of three rolled leaf springs 26; however, the number and the distribution can also be varied.

Figure 8:
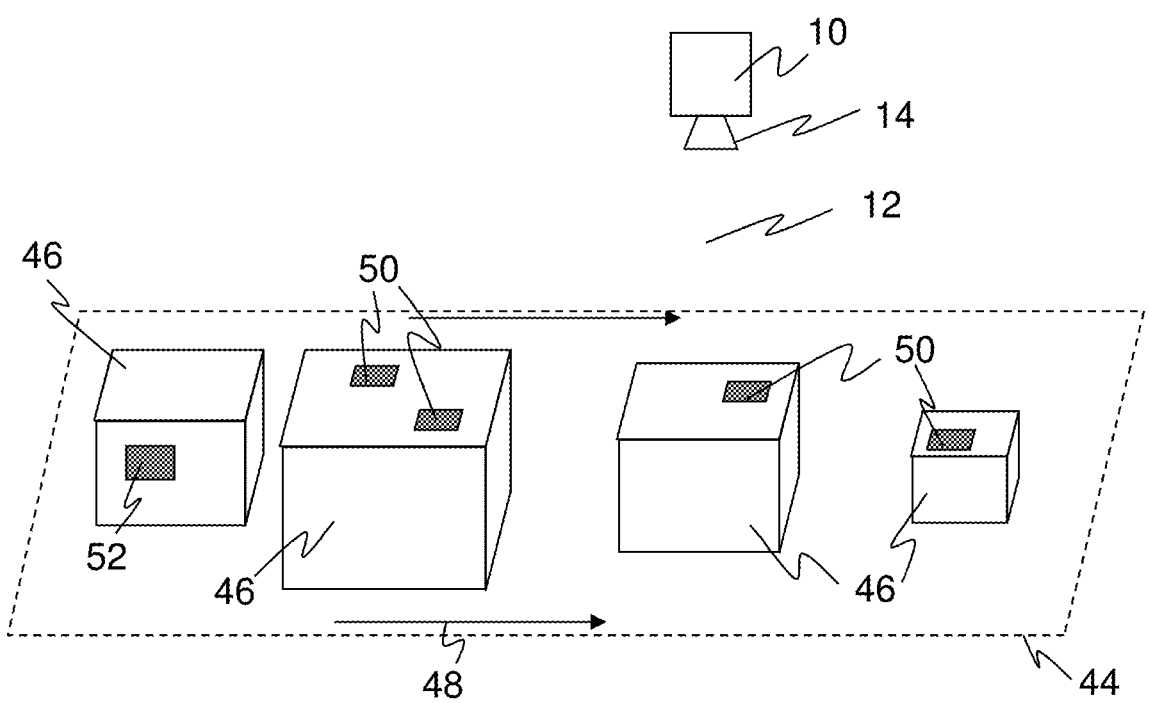
FIG. 8 a three-dimensional view of an exemplary use of an optoelectronic sensor in installation at a conveyor belt.

FIG. 8 shows a possible use of the sensor 10 in installation at a conveyor belt 44 that conveys objects 46, as indicated by the arrow 48, through the detection zone 12 of the sensor 10. The objects 46 can bear code regions 50 at their outer surfaces. It is the object of the sensor 10 to detect properties of the objects 46 and, in a preferred use as a code reader, to recognize the code regions 50, to read and decode the codes applied there, and to associate them with the respective associated object 46. In order also to recognize laterally applied code regions 52, additional sensors 10, not shown, are preferably used from different perspectives.

The invention claimed is:

1. A method for the focus adjustment of an optics of an optoelectronic sensor, wherein a movable carrier element having the optics varies its position with respect to a fixed position holding element for a setting of a focal position, and wherein the carrier element moves with respect to the holding element in that a rolled leaf spring arranged therebetween rolls on or off surfaces of the carrier element and holding element during a movement of the moveable carrier element and rotates in the course of the rolling movement, and a section of the rolled leaf spring remains in contact with the surfaces in the course of the rolling movement, and wherein sections of the rolled leaf spring remaining in contact with the surfaces differ in accordance with the rolling movement.

2. An optoelectronic sensor comprising an optics with focus adjustment, wherein the optoelectronic sensor has a movable carrier element having the optics and the optoelectronic sensor has a fixed position holding element, wherein the position of the movable carrier element is variable with respect to the holding element for an adjustment of a focal position, with at least one rolled leaf spring being arranged between the carrier element and the holding element, wherein the carrier element and the holding element each have a surface, wherein the rolled leaf spring rolls on or off the surfaces during a movement of the movable carrier element and rotates in the course of the rolling movement, and a section of the rolled leaf spring remains in contact with the surfaces in the course of the rolling movement, and wherein sections of the rolled leaf spring remaining in contact with the surfaces differ in accordance with the rolling movement.

3. The optoelectronic sensor in accordance with claim 2, wherein the rolled leaf spring forms a ring.

4. The optoelectronic sensor in accordance with claim 3, wherein the carrier element is movable in a direction in the plane of the ring.

5. The optoelectronic sensor in accordance with claim 2, wherein the rolled leaf spring is fixed to the carrier element and to the holding element.

6. The optoelectronic sensor in accordance with claim 2, wherein the rolled leaf spring has a flat outer side and the flat outer side is pressed toward the holding element and the carrier element.

7. The optoelectronic sensor in accordance with claim 2, wherein the rolled leaf spring is clamped between the holding element and the carrier element.

8. The optoelectronic sensor in accordance with claim 2, wherein said surfaces are parallel with one another.

9. The optoelectronic sensor in accordance with claim 8, wherein the surfaces have a contour to exert a preload on the rolled leaf spring.

10. The optoelectronic sensor in accordance with claim 2, wherein the surfaces have a contour to exert a preload on the rolled leaf spring.

11. The optoelectronic sensor in accordance with claim 10, wherein the contour has latch positions.

12. The optoelectronic sensor in accordance with claim 2, wherein the optoelectronic sensor has at least two holding elements and has at least two rolled leaf springs, wherein the at least two holding elements are arranged at at least two sides of the movable carrier element with a respective rolled leaf spring therebetween.

13. The optoelectronic sensor in accordance with claim 2, wherein the carrier element has an annular outer surface and the holding element has an annular inner surface, with the carrier element being concentrically arranged in the holding element and carrying out a rotational movement by rolling off the rolled leaf springs therebetween.

14. The optoelectronic sensor in accordance with claim 2, wherein the optoelectronic sensor comprises a light transmitter, wherein the optics is configured as a transmission optics associated with the light transmitter.

15. The optoelectronic sensor in accordance with claim 2, wherein the optoelectronic sensor comprises a light receiver, wherein the optics is configured as a reception optics associated with the light receiver.

16. The optoelectronic sensor in accordance with claim 2, wherein the carrier element is movably supported linearly along the optical axis of the optics by means of the rolled leaf spring.

\* \* \* \* \*